(No Model.)
T. H. MILSON.
APPARATUS FOR TESTING RIVETED PIPES.
No. 584,118. Patented June 8, 1897.
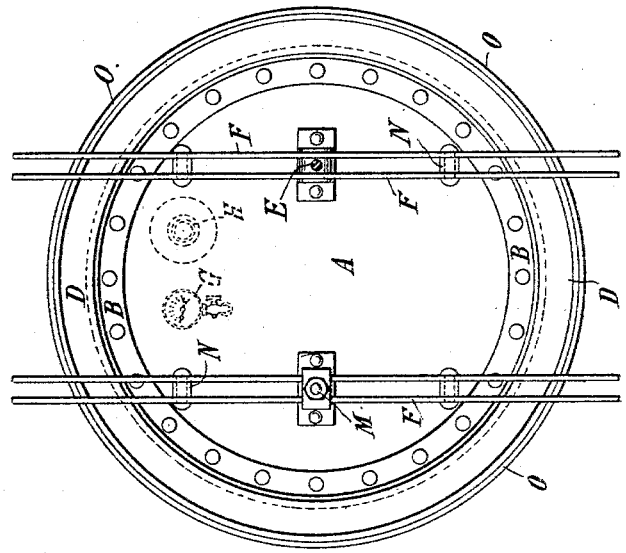
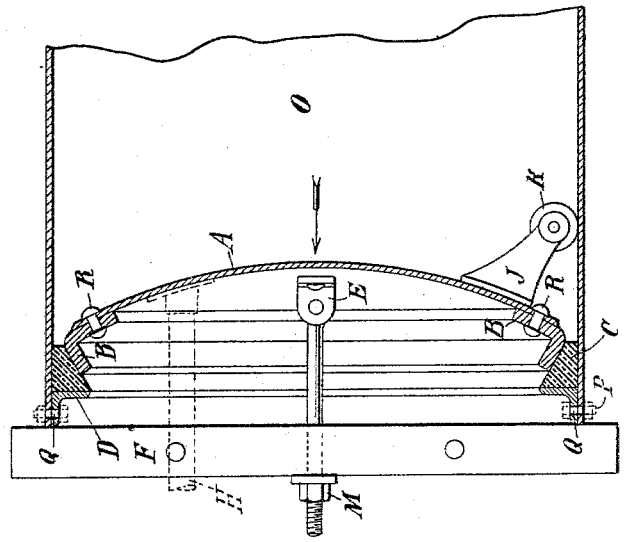
Witnesses:
Raphaël Netter
G. B. Lewis
Thomas H. Milson, Inventor
by Ken. Curtis & Page.
Att'ys.

UNITED STATES PATENT OFFICE.

THOMAS H. MILSON, OF PATERSON, NEW JERSEY, ASSIGNOR TO THE EAST JERSEY PIPE COMPANY, OF SAME PLACE.

APPARATUS FOR TESTING RIVETED PIPES.

SPECIFICATION forming part of Letters Patent No. 584,118, dated June 8, 1897.

Application filed March 23, 1897. Serial No. 628,855. (No model.)

*To all whom it may concern:*

Be it known that I, THOMAS H. MILSON, a citizen of the United States, residing at Paterson, in the county of Passaic and State of New Jersey, have invented certain new and useful Improvements in Apparatus for Testing Riveted Pipes, of which the following is a specification, reference being had to the drawings accompanying and forming a part of the same.

Large quantities of riveted pipes or conduits are at the present time employed for water-mains and similar purposes for which formerly cast iron or steel pipes were generally used. The invariable requirement of engineers that all such pipes be subjected to thorough pressure tests, while a matter of comparatively little moment with the ordinary cast-iron pipes, has become a serious problem for manufacturers of and contractors for riveted pipes, mainly for the reason that each section or length of these latter is provided with rivet-holes at the ends, which makes it difficult to temporarily close the ends water-tight. When such pipes are to be tested, it has usually been necessary to close their ends by a head riveted thereto and calked when necessary to render it water-tight, and after the test to cut the rivets or go to equally laborious methods of removing the head before another length of pipe could be joined onto the tested portion. It has also been proposed to utilize the pressure within the pipe to force a removable head against a seat on a flange formed on or secured to the end of a pipe-section, securing a water-tight joint between the head and the flange by the interposition of a softer material than the metal of the pipe. Such devices have the advantage of reinforcing the pipe end by the flange and thereby preventing spreading of the end, but the necessity of making the joint between the flange and pipe still exists. In the case of certain engineering works—as, for instance, where long lengths of large water-mains are to be laid—it is not unusual to test not only each individual pipe length, but also sections of given length of the line after being laid in the trench. The ordinary methods of testing for strength and leakage under pressure under such conditions become wholly impracticable. To meet this difficulty and to provide a simple, economical, and effective plan for subjecting riveted pipe to the ordinary pressure tests required by engineers and necessary for ascertaining the strength and soundness of the pipe is the object of my present invention.

As stated above, every length of riveted pipe has at each end a row of rivet-holes by which the abutting ends of the two pipe-lengths are joined. To close water-tight the end of such a pipe, I employ a suitable ring of iron or steel which fits within the end of a pipe and which is temporarily secured to the same pins or bolts inserted through the said rivet-holes and corresponding holes in the ring. This ring serves as an abutment for a head, or, as it is sometimes called in shop parlance, a "dead-cap," which serves the same purpose as the heads which were previously riveted in the ends of the pipe. Inasmuch, however, as it would require the nicest-fitting metallic surfaces to make a water-tight joint between the pipe, the ring, and the head, I place upon the ring a washer of a yielding material, such as rubber, of such form as to constitute a yielding-seat for the head, and which under pressure will spread and serve as a packing to close all the joints at the end of the pipe. Such a device secures a more perfect water-tight end for testing purposes than can practically be secured by riveting in a simple metal head, and may be applied and removed with slight trouble and little expense.

So far as I am aware no means for closing riveted pipe ends for testing purposes except by heads with riveted or calked joints or by means of a head resting upon a flange secured to the pipe end with a water-tight joint was known or used prior to my invention of this device, and I therefore believe myself to be entitled to protection not only for the device in the specific form in which I shall describe and illustrate it herein, but in any other form which possesses the characteristics enumerated in the subjoined claims.

In the drawings hereto annexed, and which illustrate my invention in the best and most practicable form of which I am aware, Figure 1 is a sectional view of a portion of a length of pipe with the improvement applied thereto. Fig. 2 is an end view of the same.

O is a portion of a pipe of the kind known as "riveted pipe," and having a series of rivet-holes Q drilled or punched therein near its end.

D is a ring of angle-iron of a diameter which just fits the interior of the pipe.

P P are bolts or pins which are passed through the rivet-holes in the pipe and similar holes in the ring D to secure the ring in place.

C is a washer of rubber which lies on the shoulder or abutment formed by the ring D.

A is a head of sufficient strength to resist the internal pressure to which the pipe is likely to be subjected and resting upon the washer C. I prefer to use a washer of substantially the cross-section shown—that is to say, with its inner side sloping back from the edge of the abutment D—and to give to the edge of the head A a corresponding shape by turning or bending it toward the center, so as to secure the spreading or wedging effect of a tapered plug in a corresponding opening. In order also to reduce the weight of the head without impairing its strength, I employ a cast ring B for the edge, to which a thinner rounded or dished plate A, generally of steel, is secured by rivets R.

As a matter of convenience in handling and to prevent the head from falling back into the pipe when inserted in its end, I provide a foot J with a roller F thereon.

The head A may be provided with crowfeet-braces E E, extending outward and secured by bolts M or otherwise to iron bars F F, which rest against the end of the pipe. The purpose of these bars F and braces E is to steady the head and hold it firmly on its seat independently of the internal pressure acting upon it and until the latter is sufficient to maintain a water-tight joint. Spreaders N may be placed between the bars F F when they are used in pairs, as shown in Fig. 2.

In applying and using the improvement for testing a pipe or any given length of the same the head A is first introduced into the open end of the pipe. The foot J will preserve it from falling back into the pipe. The washer C is next placed in the open end, and finally the ring D. This latter is secured to the pipe by bolts and nuts passed through a sufficient number of the rivet-holes. The washer is then pressed down upon the shoulder or abutment which the ring D forms and the head drawn up and tightened by the braces extending therefrom. Water or other fluid is then introduced into the pipe, as by means of a pipe H, extending from the head A, and the pressure raised to the desired point, which may be ascertained by an ordinary pressure-gage G, set in the head A and indicated in dotted lines in Fig. 2. The internal pressure forces the head A in the direction of the arrow in Fig. 1. This serves to tighten the edges of the head upon the rubber washer and maintain a perfectly water-tight joint. The ring B, being bolted at more or less points to the end of the pipe, strengthens the latter and prevents it from spreading under the force of the internal pressure acting thereon through the rubber washer C. The ring D thus subserves the double function of preventing spreading of the pipe end and of affording an abutment or seat for the head. After the pressure test, for whatever purpose it may have been made, is accomplished the braces E, bolts M, and bars F are removed, the pins or bolts P taken out, and the ring, washer, and head removed.

The specific construction of the parts composing the improvement may be greatly varied without departure from the invention. I may also employ in their construction any materials other than those mentioned which will accomplish the same result.

What I claim as of my invention is—

1. A device for temporarily closing a pipe end, comprising, in combination, a removable pressure-resisting head fitting the interior of the pipe, and internal shoulder or abutment capable of detachable attachment to the end of the pipe and forming a seat for the head under the action of internal pressure and a washer of elastic material interposed between the shoulder and the head and adapted, under pressure of the head, to close water-tight the joints or seams between the head, shoulder and pipe, as set forth.

2. The combination with a pipe or conduit having a series of rivet-holes at its end, of a removable pressure-resisting head fitting within the pipe, a reinforcing shoulder or flange secured to the pipe by bolts or pins passing through the rivet-holes and forming a seat for the head within the pipe, and a washer of elastic material interposed between the shoulder and the head and adapted, by the pressure of the head, to be spread and forced into close contact with the sides of the pipe, as set forth.

3. The combination with a pipe or conduit having a series of rivet-holes at its end, of a removable pressure-resisting head fitting within the pipe, and having centrally-inclined edges, a ring bolted within the pipe and forming a shoulder or abutment for the head, and a washer laid thereon forming a conical water-tight seat for the head, as set forth.

4. The combination with a pipe or conduit having a series of rivet-holes at its end, of an annular angle-iron secured within the end of the pipe by bolts passing through the rivet-holes, a rubber washer placed on the angle-iron and adapted by the pressure of a head thereon to be forced against the shoulder and the sides of the pipe, a pressure-resisting head fitting within the pipe and resting upon said washer, a pipe and a pressure-gage fitted to the said head, as set forth.

5. The combination with a pipe or conduit having a series of rivet-holes at its end, a ring secured within the end of the pipe by bolts or pins passing through the rivet-holes, a pressure-resisting head, a rubber washer between the ring and head and adapted, by the pressure of the head, to be forced against the sides of the pipe, and means for forcing said head into its seat independently of internal pressure, as set forth.

THOMAS H. MILSON.

Witnesses:
M. LAWSON DYER,
G. W. MARTLING.